United States Patent [19]

Ersfeld et al.

[11] 3,913,892
[45] Oct. 21, 1975

[54] MIXING APPARATUS

[75] Inventors: Heinrich Ersfeld, Bergisch Neukirchen; Klaus Schulte, Leverkusen; Heinrich Boden, Opladen, all of Germany

[73] Assignee: Bayer Aktiengesellschaft, Leverkusen Bayerwerk, Germany

[22] Filed: July 16, 1974

[21] Appl. No.: 489,027

[30] Foreign Application Priority Data
Sept. 27, 1973 Germany............................ 2348609

[52] U.S. Cl..................... 259/4; 23/252 R; 425/4 R
[51] Int. Cl.².......................... B01F 15/02; B01F 3/08
[58] Field of Search............. 259/4, 18, 5, 6, 21, 22, 259/36; 23/252 R; 425/4 R, 130, 206

[56] References Cited
UNITED STATES PATENTS

| 2,885,268 | 5/1959 | Breer | 425/4 R |
|---|---|---|---|
| 3,057,273 | 10/1962 | Wilson | 259/4 |
| 3,353,918 | 11/1967 | Perrin | 259/4 |
| 3,788,337 | 1/1974 | Breer | 425/4 R |

Primary Examiner—Robert W. Jenkins
Attorney, Agent, or Firm—Lawrence S. Pope

[57] ABSTRACT

An apparatus adapted for mixing liquids together particularly advantageous for mixing liquid components of reaction mixture which upon chemical reaction forms a polyurethane foam, has a pair of lift slides disposed with guide bores in a suitable housing, longitudinally spaced parts for introduction of liquid into the lift slides, ports for flow of liquid from the lift slides for recirculation of the liquid and ports for flow of liquid from the lift slides into a mixing chamber, and means for moving the lift slides in the guide bores for positioning the ports alternately into a rest and working position.

7 Claims, 9 Drawing Figures

MIXING APPARATUS

This invention relates generally to apparatus for mixing components of a polyurethane reaction mixture together and more particularly to a mixing machine for the production of foams or homogeneous materials from liquid reaction components, based for example on polyurethane, having a mixing head formed by a housing which accommodates a control unit and a mixing chamber with an outlet opening, the control unit having lift slides formed with injection openings which are connected to inlet openings in the working position of the mixing head, are fixed to a common yoke equipped with a control drive and are guided in guide bores separated from one another by a land, and a dividing plane extending through the mixing chamber.

Machines of this kind are known and commercially available as "slide mixing heads". They are generally combined with molds. With known machines of this kind, it has not been possible with any degree of certainty to prevent small quantities of the components from continuing to drip through on completion of the mixing operation. These component residues form moist, tacky zones on the remainder of the mixture which has reacted to completion in the mixing chamber and on the wall of the mixing chamber. An additional compressed air flushing unit does not provide the required result either. Flushing units based on solvents are unsuitable for physiological reasons and are too complicated. Accordingly, the required result, namely to provide a mixing chamber that does not require cleaning between mixing steps, has never been satisfactorily obtained.

It is therefore an object of the present invention to provide a machine having slide mixing heads designed to avoid residues which foul the mixing chamber and adapted to cover a wide output range. Another object of the invention is to provide an apparatus of the "lift slide" type which can be used intermittently without intermediate cleaning and which does not permit dripping of reaction mixture after the working cycle has been completed.

Other objects will become apparent from the following description with reference to the accompanying drawings wherein.

Figure 1:
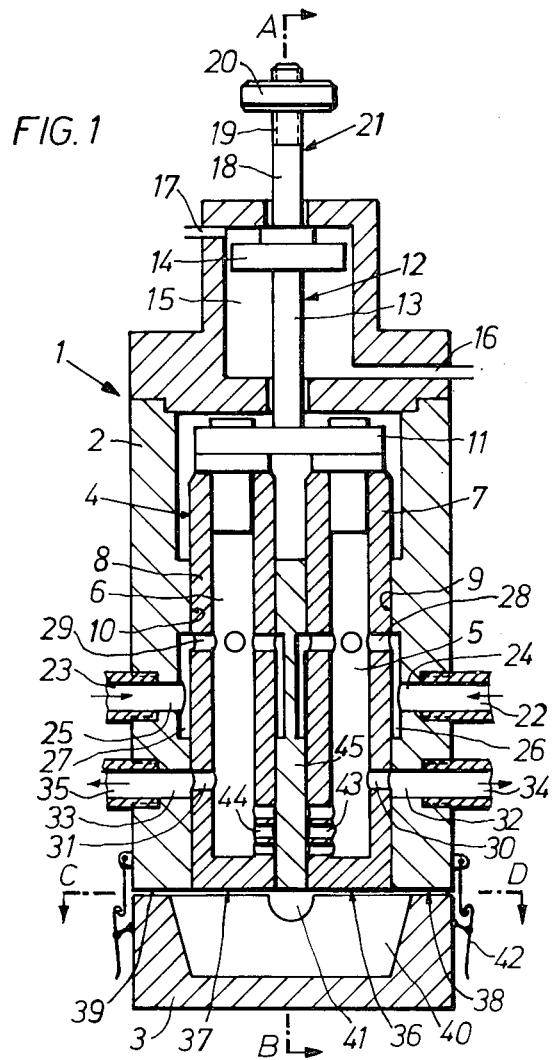
FIG. 1 is a longitudinal section through a first embodiment of a mixing head provided by the invention disposed in the rest or non-charging position.
Figure 2:
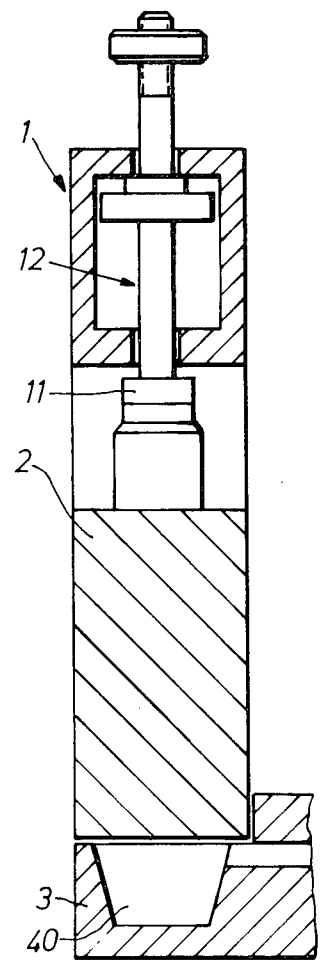
FIG. 2 is a section through the mixing head shown in FIG. 1 on the line A - B.
Figure 3:
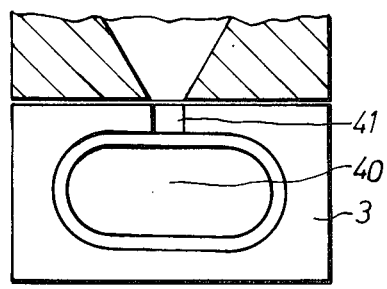
FIG. 3 is a section through the mixing head shown in FIG. 1 on the line C - D.

The foregoing objects and others are accomplished in accordance with this invention, generally speaking, by providing a mixing apparatus having a housing enclosing a pair of guide bores, a lift slide disposed in each bore having a bore for flow of fluid extending longitudinally therein with an open end and a closed end, a yoke disposed in the housing and attached to the open ends of the lift slides, means for introducing fluid into the bores of the lift slides, ports through the wall of each lift slide near the closed end thereof for flow of fluid therefrom, a partitioning member or land disposed between the lift slides to seal the ports against fluid flow when the lift slides are in a non-charging position, means for flow of fluid from the bores in the lift slides connected to means for recirculating fluid when the lift slides are in the non-charging positions, a mixing chamber, and means for moving the yoke and lift slides to alternate positions where the ports permit flow of fluid either into the mixing chamber or into the means for recirculating the fluid.

The objects of the invention are achieved with the machine provided by the invention because a. in the rest position the injection openings of the lift slides are withdrawn into the guide bores, while b. in the working position the injection openings are disposed in the mixing chamber so that each lift slide at least partly exposes at least one injection opening or port.

It has been found that, when the lift slides are withdrawn into the rest position, the mixture residue left in the mixing chamber is again thoroughly whirled around under the effect of the reduced pressure formed, so that any droplets of components continuing to drip through are entrained and homogeneously mixed with the reaction mixture. Accordingly, it is not possible for any tacky deposits that would interfere with the next mixing operation to accumulate on the wall of the mixing chamber. Another particular advantage is that the injection openings of the two lift slides can face one another across an extremely narrow gap because there is virtually no limit to the narrowness of the land or partition arranged in between. The lift slides do not show any leakage by virtue of the considerable overlaps in the rest position.

Another particular advantage is that the mixing chamber can be adapted to meet particular requirements in regard to, for example, throughput, properties of the mixture, viscosity and mold-releasability of the rest of the mixture hardening in the mixture chamber. Accordingly, the mixing chamber can, with advantage, be accommodated in a replaceable unit. In cases where the machine provided by the invention is combined with a mold, the unit containing the mixing chamber can be introduced into an opening provided specifically for this purpose in one of the mold halves. Another advantage of this arrangement, in which the control unit and the mixing chamber are arranged in separate housings, is that the position and size of the bore through which the mixture is discharged can be selected in such a way that the requisite mixing chamber pressure, adapted to a particular foam system, is achieved. This mixing chamber pressure, which is also known as the dynamic pressure, has a considerable bearing upon the quality of mixing. Providing the mixing chamber pressures are optimally adjusted, there is no need to use remixers. The construction according to the invention provides in particular for satisfactory mixing at the beginning of the mixing process when the inlet openings are released.

In one particular embodiment of the machine according to the invention, the control unit is arranged in a first housing section and the mixing chamber with its outlet opening is substantially arranged in a second housing section, the dividing plane extending between the first housing section and the second housing section and forming a tangent to the mixing chamber. In this way, the first housing section accommodating the control unit forms a flat end surface on which no mixture residues are able to accummulate with the vertical lift slides withdrawn into the housing section.

The machine according to the invention may be combined with a mold, and the mixing chamber with its outlet opening is preferably arranged in one-half of the mold. It can be surmounted and sealed off by the control unit, with the result that only one control unit is required for several molds. It is possible to obtain extremely high contact pressures without subjecting the control unit to any distortion.

In one embodiment, the control unit is arranged in the other half of the mold. This is of advantage in cases where the mold is in continuous use, i.e. in cases where it is desired to eliminate the need to mount the housing section accommodating the control unit on the mold in order to save time. The first housing section accommodating the control unit is also eminently suitable for working with so-called lost mixing chambers. Lost mixing chambers are mixing chambers of the kind which, for example in cases where it is desired to fill empty spaces with foam, as in the motor vehicle industry, the foaming ingredients are introduced into hollow sections and the mixing chamber is part of or inserted into the walls of those sections.

In one preferred embodiment, the control drive is equipped with a stroke adjuster. The stroke adjuster may consist for example of an adjustable stop screw with which the stroke of the control drive can be adjusted and limited. This embodiment is of particular advantage in cases where the lift slides comprise several injection openings, possibly differing in cross-section, one above the other. By adjusting the stroke height, it is possible to vary the number of injection openings which are released for the mixing operation. By using the lower edges of the land as control edges, it is also possible for individual bores to be partially masked by the inner land surface, with the result that these control edges only release part of the injection openings.

It is of course also possible for the lift slides to be additionally equipped with a rotary drive so that the injection openings can also be controlled by turning the slides. In this case, however, corresponding control edges must be provided inside the mixing chamber.

The fact that the vertical lift slides are fixed for longitudinal adjustment to the yoke is also of advantage. In this case, the lift slides can be axially adjusted relative to one another in order to obtain different mixing ratios between the components.

In another particular embodiment, which not only can be used in conjunction with the machine according to the invention, but affects all the slide mixing heads whose slides are provided with injection openings, adjustable pins are arranged in the injection openings. These pins can be used to influence the shape and size of the injection cross-section, with the result that it is possible to obtain specific forms of spray cones for the jets of components.

The pins preferably taper in the outlet direction of the injection openings. In this way, the injection openings can even be completely closed. The injection openings can also be closed in cases where the pins are formed with different types of sealing surfaces which co-operate with corresponding sealing surfaces in the vertical lift slide.

Several embodiments of the mixing head of the machine according to the invention are illustrated purely diagrammatically in section in the accompanying drawings and described in detail in the following.

Figure 4:
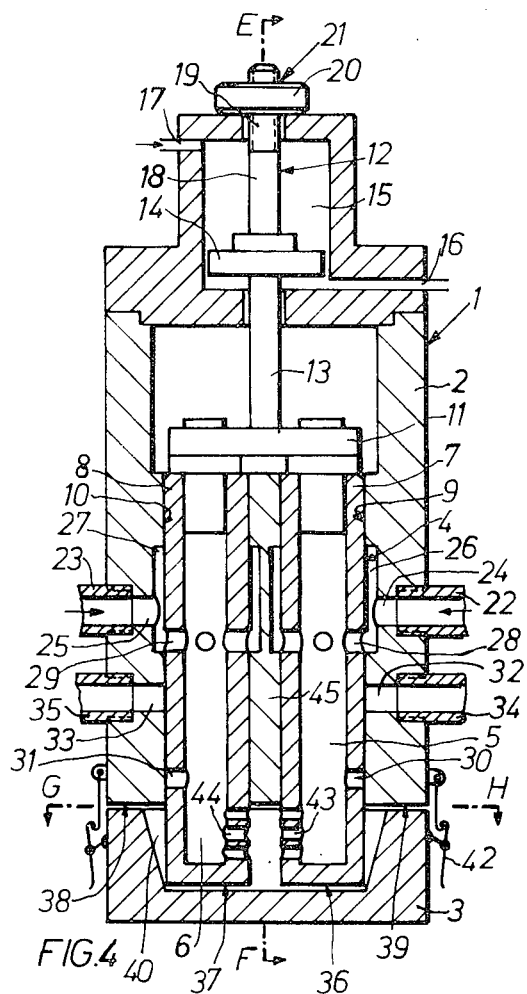
FIG. 4 is a longitudinal section through the embodiment of the mixing head shown in FIG. 1 in the working or charging position.
Figure 5:
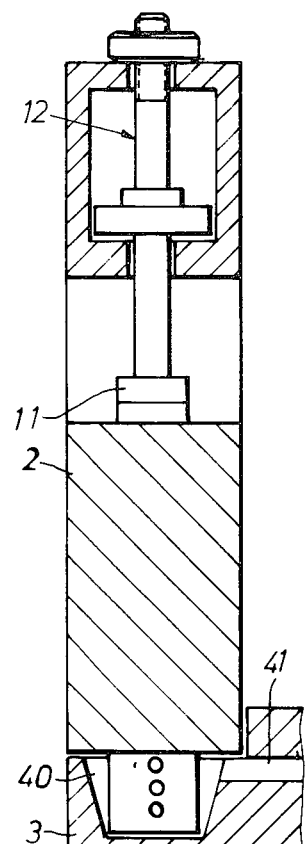
FIG. 5 is a section through the mixing head shown in FIG. 4 on the line E - F.
Figure 6:
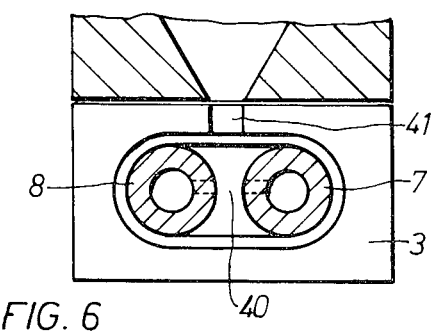
FIG. 6 is a section through the mixing head shown in FIG. 4 on the line G - H.

As shown in FIGS. 1 to 6, the mixing head 1 has a first housing section 2 and a second housing section 3. The control unit 4 is accommodated in the first housing section 2. Control unit 4 has two lift slides 7 and 8 formed with longitudinal hollow bores 5 and 6. The vertical lift slides 7 and 8 are mounted in laterally spaced guide bores 9 and 10 in housing 2 and fixed to a common yoke 11. The yoke 11 is connected to a hydraulic control drive 12 having a piston rod 13 with a double-acting piston 14 accommodated in a chamber 15 provided with inlets and outlets 16 and 17 for the hydraulic liquid on either side of the piston 14. An extension arm 18 of the piston rod 13 is guided out of the housing section 2 and formed with a screwthread 19. This extension arm 18 forms a stroke adjuster 21 together with a locknut 20 screwed onto the thread 19. In the working position of the mixing head 1, the locknut 20 is in contact with the housing section 2 (as shown in FIGS. 4 and 5). Feed lines 22 and 23 open through feed bores 24 and 25 into annular grooves 26 and 27 which surround the lift slides 7 and 8 and whose height corresponds at least to the maximum stroke of the lift slides 7 and 8. Inlet bores 28 and 29 in the lift slides 7 and 8 connect the annular grooves 26 and 27 to the hollow bores 5 and 6 of the lift slides 7 and 8 in each position of the slides. In the rest position, the inflowing components are diverted through outlet bores 30 and 31 provided in the lift slides 7 and 8 and bores 32 and 33 formed in the housing section 2 into the adjoining return lines 34 and 35. In the rest position, the end faces 36 and 37 of the lift slides 7 and 8 form a flat plane with the end face 38 of the housing section 2.

The second housing section 3 faces this plane separated by a dividing plane 39. It accommodates the mixing chamber 40 with its outlet opening 41. The two housing sections 2 and 3 are designed to be pressed tightly against one another by quick-acting closure members 42. In the working position (FIGS. 4 and 5), the lift slides 7 and 8 project into the mixing chamber 40 corresponding to the adjusted stroke height so that the injection openings 43 and 44 face into the mixing chamber 40. The guide bores 9 and 10 of the lift slides 7 and 8 are separated from one another by a land 45 approximately 5 mm wide.

Figure 7:
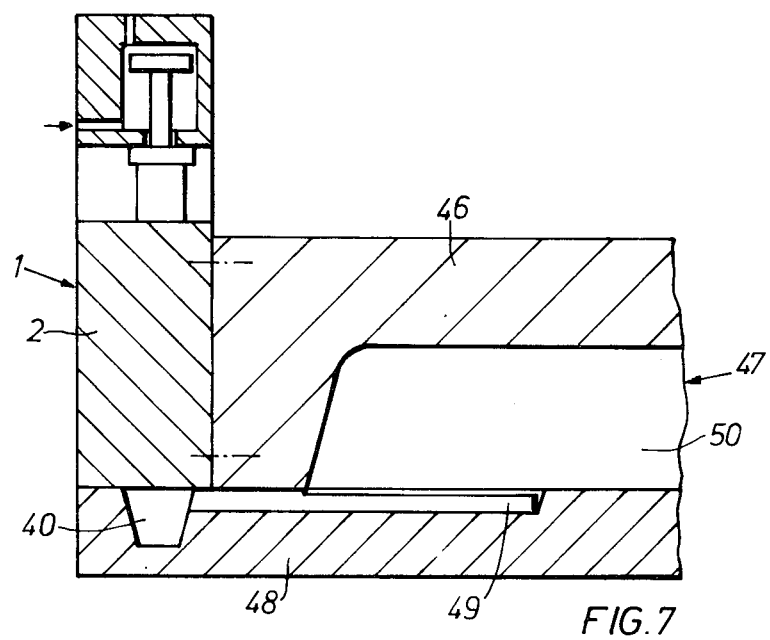
FIG. 7 is a longitudinal section through another embodiment of the invention with the mixing head arranged on a mold in the rest position.
Figure 8:
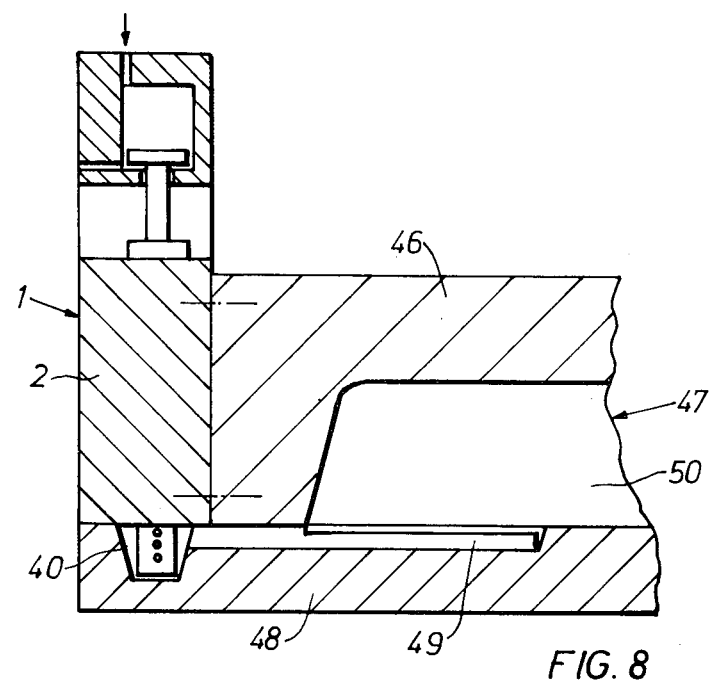
FIG. 8 is a longitudinal section through the mixing head illustrated in FIG. 7 in the working position.

As shown in FIGS. 7 and 8, the mixing head 1 may be arranged with its housing section 2 on the upper half 46 of a mold 47, while the housing section accommodating the mixing chamber 40 is intergrated into the lower mold half 48. The outlet opening is adjoined by a sprue channel 49 which opens into a mold cavity 50.

Figure 9:
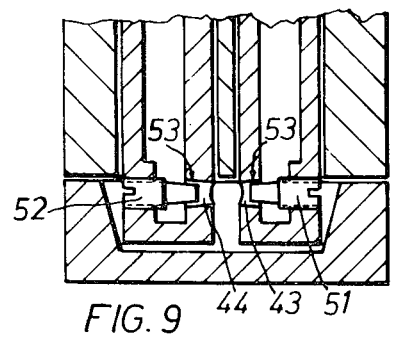
FIG. 9 is a longitudinal section through part of a modification of the mixing head illustrated in FIGS. 1 to 6 in the working position, the injection openings of the lift slides being equipped with conical adjustable pins.

As shown in FIG. 9, conical adjustable pins 51 and 52 may be arranged in the injection openings 43 and 44 so that the opening cross-section is adjustable. The injection openings 43 and 44 are provided internally with a sealing surface 53 co-operating with the conical pins 51 and 52. This is of importance in cases where several injection openings 43 and 44 are arranged in the lift slides 7 and 8, because in this way individual injection openings 43 and 44 can be completely closed by means of the pins 51 and 52 in order to vary the feeds.

In operation, one component of a reaction mixture may be introduced under pressure into bore 5 of lift slide 7 from a suitable storage tank or other source thereof through line 22 and opening 28 while another component is introduced under pressure into bore 6 of lift slide 8 through line 23 and port 29. One component may be for example a liquid polyol such as a poly(alkylene ether)polyol mixed with a catalyst and blowing agent while the other component may be an organic polyisocyanate such as tolylene diisocyanate or the like. Where the two components are first introduced into bores 5 and 6, the lift slides may be in the rest position illustrated in FIGS. 1 – 3 and the components will flow from the lift slides through ports 30 and 31 for recirculation. When it is desired to charge the components into mixing chamber 40, hydraulic fluid under pressure is introduced through line 17 into chamber 15 to move the piston 14, yoke 11 and lift slides 7 and 8 from the position shown in FIGS. 1 – 3 to the position shown in FIGS. 4 – 6, 8 and 9. Liquid then flows from bores 5 and 6 through ports 43 and 44 into chamber 40 in predetermined proportions to form a foamable reaction mixture. This mixture may be charged through sprue 49 into mold cavity 50 where it will expand and solidify into a polyurethane foam product having the shape of mold cavity 50.

The apparatus may be used for mixing any two liquid components together. Suitable formulations for making foams and non-porous polyurethanes with the apparatus provided by this apparatus are disclosed in the book "*Polyurethanes: Chemistry and Technology*" by Saunders and Frisch, published by Interscience Publishers and in U.S. Pat. Nos. 3,194,773, 3,488,300 and 3,238,154.

Although the invention has been described in detail for the purpose of illustration it is to be understood that such detail is solely for that purpose and that variations may be made therein by those skilled in the art without departing from the spirit and scope of the invention except as it may be limited by the claims.

What is claimed is:

1. In a machine for the production of foams or homogeneous materials from liquid reaction components comprising feed lines equipped with pumps leading to a mixing head, said mixing head having a housing, a control unit and a mixing chamber with an outlet opening enclosed by the housing, the control unit comprising lift slides formed with injection openings which are connected to the feed lines in the working position, said lift slides being fixed to a common yoke equipped with a control drive, said lift slides being disposed in guide bores separated from one another by a land and a junction plane extending through the mixing chamber, the improvement which comprises lift slides adapted to be withdrawn into the guide bores while in the rest position with their injection openings disposed in said guide bores and adapted to be introduced into a mixing chamber in their working position to such an extent that at least a portion of one injection opening in each lift slide is disposed in the mixing chamber for injection of fluid therein.

2. A machine as claimed in claim 1, wherein a control unit is accommodated in a first housing section while the mixing chamber with its outlet opening is substantially accommodated in a second housing section and a junction plane extends between the first housing section and the second housing section and forms a tangent to the mixing chamber.

3. A machine as claimed in claim 1 wherein the control drive is equipped with a stroke adjustment.

4. A machine as claimed in claim 1 wherein adjustable pins are arranged in the injection openings.

5. A machine as claimed in claim 4, wherein tapered pins are disposed in the injection openings.

6. An apparatus for mixing liquids together comprising a two-piece housing, a cavity in a first of the said pieces of the housing forming a mixing chamber, a pair of guide bores extending longitudinally through a second of said pieces, means for attaching the two pieces together with the cavity communicating with the guide bores, a lift member having a bore therein with a closed end disposed slidably in each guide bore with the closed end adjacent the cavity, an opening in the wall of each lift slide adjacent the said closed end for flow of liquid from the bore of the lift slide, a yoke attached to those ends of the lift slides opposite the closed ends, means for moving the yoke longitudinally in the guide bores from a position where the said openings are in the cavity to a withdrawn position where the openings are within the guide bores, a partitioning member disposed between the lift slides and blocking said opening when the lift slides are in the withdrawn position, a pair of longitudinally spaced ports through the second piece of the housing into each of the guide bores, a first of said spaced ports of each pair being connected to a source of liquid for flow of liquid towards the bore of the lift slide and the second port of each pair being connected to the said source for recirculation of the liquid, a pair of ports in each lift slide spaced longitudinally from each other whereby the first of each pair of lift slide ports communicates with a first housing port when the lift slides are in the rest or working position and the second of each pair communicates with the second housing port when the lift slide is in the rest position but is moved out of said communication with the lift slides are in the working position.

7. The apparatus of claim 6, wherein a tapered pin is disposed in the said openings in the lift slides.

* * * * *